(12) United States Patent
Noble et al.

(10) Patent No.: US 8,286,392 B2
(45) Date of Patent: Oct. 16, 2012

(54) INHABITABLE SPACE FRAMES

(76) Inventors: David Noble, Pasadena, CA (US);
James Chuda, Los Angeles, CA (US)

(*) Notice: Subject to any disclaimer, the term of this patent is extended or adjusted under 35 U.S.C. 154(b) by 0 days.

(21) Appl. No.: 13/057,132

(22) PCT Filed: Jun. 19, 2009

(86) PCT No.: PCT/US2009/047915
§ 371 (c)(1),
(2), (4) Date: Mar. 14, 2011

(87) PCT Pub. No.: WO2010/016974
PCT Pub. Date: Feb. 11, 2010

(65) Prior Publication Data
US 2011/0146166 A1    Jun. 23, 2011

(51) Int. Cl.
*E04H 1/04* (2006.01)
(52) U.S. Cl. ................................. 52/79.4; 52/652.1
(58) Field of Classification Search .............. 52/79.4, 52/81.2, 651.01, 652.1
See application file for complete search history.

(56) References Cited

U.S. PATENT DOCUMENTS

| | | | |
|---|---|---|---|
| 2,682,235 A | 6/1954 | Fuller | |
| 3,333,375 A | 8/1967 | Johnston | |
| 3,618,273 A * | 11/1971 | Crandall | 52/79.4 |
| 3,685,221 A * | 8/1972 | Mangan | 52/80.1 |
| 3,710,528 A * | 1/1973 | Riedberger et al. | 52/236.1 |
| 3,913,285 A * | 10/1975 | Helfrich | 52/64 |
| 3,974,600 A * | 8/1976 | Pearce | 52/81.2 |
| 4,207,715 A * | 6/1980 | Kitrick | 52/81.4 |
| 4,723,382 A * | 2/1988 | Lalvani | 52/81.1 |
| 5,331,779 A * | 7/1994 | Hing | 52/80.1 |
| 5,505,035 A * | 4/1996 | Lalvani | 52/648.1 |
| 5,524,396 A | 6/1996 | Lalvani | |
| 6,931,812 B1 * | 8/2005 | Lipscomb | 52/653.1 |
| 7,452,578 B2 * | 11/2008 | Lanahan | 428/36.1 |
| 2007/0151173 A1 | 7/2007 | Paugh | |

FOREIGN PATENT DOCUMENTS

GB         2251872 A  *  7/1992
WO   2010/016974 A1     2/2010

OTHER PUBLICATIONS

Search Report and Written Opinion.

* cited by examiner

*Primary Examiner* — Christine T Cajilig
(74) *Attorney, Agent, or Firm* — Howard & Howard Attorneys PLLC

(57) ABSTRACT

An inhabitable space frame (100) can define and support inhabitable living space within, around and projecting from the exterior of the perimeter of the space frame (100). The space frame (100) includes a vector matrix of strut members (105) that defines a plurality of interconnected basic tetrahedral modules (110) and, optionally, a plurality of prime octahedral modules (115). At least a part of each prime octahedral module (115) in the plurality of prime octahedral modules (115) is adjacent to at least two of the basic tetrahedral modules (110). Use of one or more right triangular faces, or planes, within a repeating geometry of a vector matrix enables an interior of the space frame (100) to be inhabitable, with horizontal floors and vertical walls aligned with associated strut members (105).

7 Claims, 16 Drawing Sheets

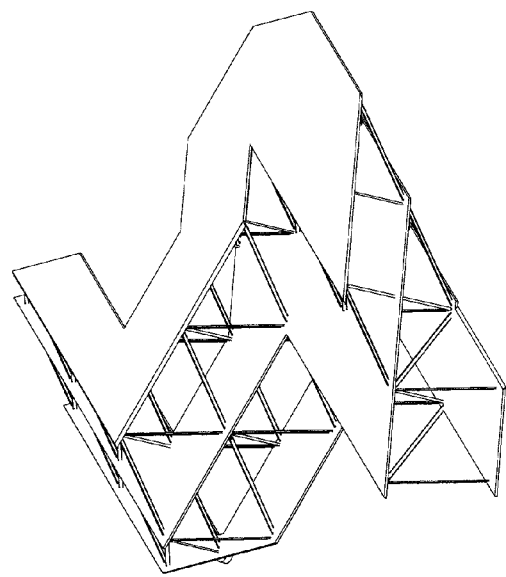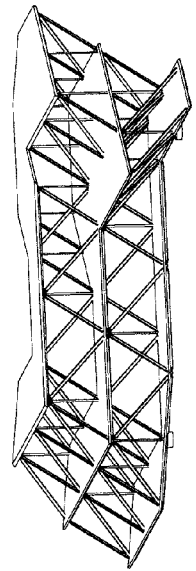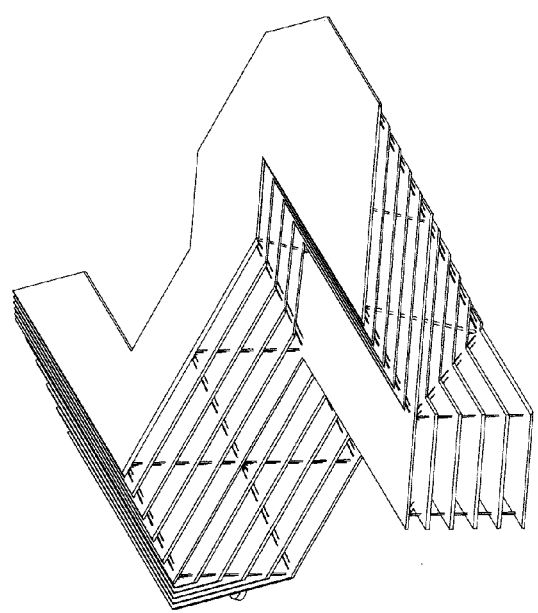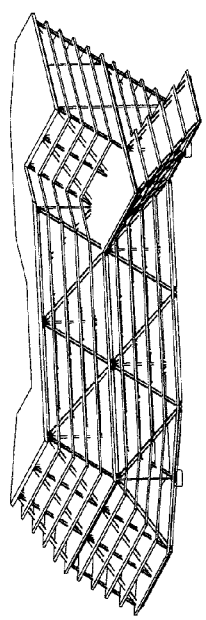

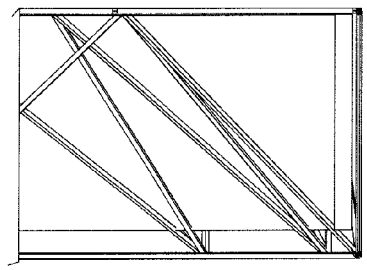
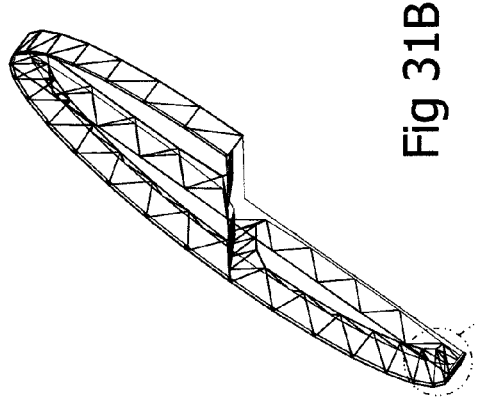
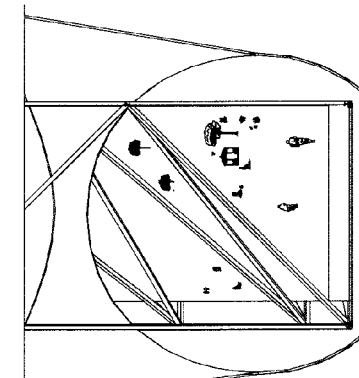
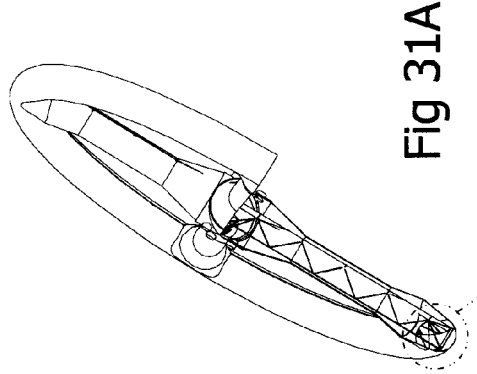

ject/related-invention text follows:

INHABITABLE SPACE FRAMES

FIELD OF THE INVENTION

The present invention relates generally to buildings; in particular, although not exclusively, the invention relates to space frames that include inhabitable modules.

BACKGROUND OF THE INVENTION

Space frames have been used for decades in various building applications, such as large roof spans. Space frames generally are lightweight, rigid, inexpensive, and strong building components. They generally require less building materials than alternative technologies, as they are made from truss-like, interlocking struts. Bending moments can be resisted in space frames by using only tensile and compressive loads in each strut.

Compared to space frames, traditional rectilinear structures are generally based on hexahedral geometries, and the structural stability of such traditional structures requires lateral supports such as buttresses, cross bracing, shear walls, and/or stiff, moment-resisting joints. These traditional structures have evolved from pre-historic buildings that include post and beam supports to modern steel high-rise structures. However, as the height of such structures increases, costs can rise disproportionately concerning general engineering, and concerning specific features such as seismically resistant-cantilevered foundations and ductile frames that bend to absorb lateral forces. Thus financial, environmental, and space concerns can sometimes make such structures inefficient and undesirable.

Modern space frame technologies also have some undesirable features. Generally, and with few exceptions, they are based on equilateral geometry within which right triangular faces are not possible. For example, struts in conventional space frames present sloping structural members within an equilateral tetrahedral geometry that present significant headroom obstacles. Such struts are often arranged in isotropic vector matrices that are not amenable to supporting the hexahedral geometries (i.e., vertical walls, horizontal floors and horizontal areas clear for human inhabitation beneath ceilings) of conventional living spaces. There is therefore a need for an improved space frame geometry that overcomes the above-described problems of traditional rectilinear structures and prior art space frame technology.

The present invention is aimed at one or more of the problems identified above.

SUMMARY OF THE INVENTION

Some embodiments of the present invention define a space frame with non-equilateral geometry so that there is at least one right triangular face within the tetrahedral modules of its matrix, and or the space frame is designed and used for human inhabitation with horizontal floors and vertical walls aligned with its members. According to some embodiments, when one edge of repeating right triangular faces within a space frame is set horizontally level, the adjacent perpendicular edge of one or more right triangular faces may be set vertically. This eliminates most interior headroom obstructions resulting from sloping strut members within the space frame. The use of one or more right triangular faces, or planes, within a repeating geometry of a vector matrix enables the interior of a space frame to be inhabitable, with horizontal floors and vertical walls aligned with its strut members. Space frames according to some embodiments of the present invention may also be described as "anisotropic", "irregular", "isosceles", or "scalene", and such space frames are non-equilateral, including at least one right triangular face, or plane, within their repeating tetrahedral modules.

In one form, although not necessarily the only or the broadest form, the invention resides in an inhabitable space frame, comprising:
a vector matrix of strut members that defines:
a plurality of interconnected basic tetrahedral modules; and optionally
a plurality of prime octahedral modules wherein at least a part of each prime octahedral module in the plurality of prime octahedral modules is adjacent to at least two of the basic tetrahedral modules.

Optionally, the vector matrix of strut members comprises strut members having only four discrete, different lengths.

Optionally, the vector matrix of strut members comprises strut members having an indefinite number of discrete, different lengths.

Optionally, the plurality of basic tetrahedral modules and the plurality of prime octahedral modules define a plurality of floor areas, each at a different vertical level, within, around and projecting from the exterior of a perimeter.

Optionally, the plurality of floor areas is suspended within an interior atrium of the space frame.

Optionally, the inhabitable space frame supports an office or apartment building, a retail/wholesale store, a hotel, an institutional building, an industrial building, an agricultural building or a mega-structure supporting mixed-use projects.

Optionally, the inhabitable space frame is supported on footings having seismic isolators.

BRIEF DESCRIPTION OF THE DRAWINGS

By way of example only, preferred embodiments of the invention are described more fully hereinafter with reference to the accompanying figures, wherein:

FIG. 19A is a perspective view of the model of FIG. 17A.

FIG. 19B is another perspective view of the model of FIG. 17A further illustrating the strut members and one floor per module of the present invention and without showing secondary construction.

FIG. 20A is another perspective view of the model of FIG. 17A.

FIG. 20B is yet another perspective view of the model of FIG. 17A further illustrating the strut members and one floor per module of the present invention and without showing secondary construction.

FIG. 31A is a perspective view of a model of a ring-shaped spinning space station according to some embodiments of the present invention.

FIG. 31B is another perspective view of the model of FIG. 31A further illustrating the strut members and one cylindrical floor of the present invention and without showing secondary construction.

FIG. 32A is a detail view of a partial cross section of the model of FIG. 31A.

FIG. 32B is another detail view of a partial cross section of the model of FIG. 31A further illustrating the strut members and section of the cylindrical floor of the present invention and without showing secondary construction.

DETAILED DESCRIPTION OF INVENTION

Figure 1:
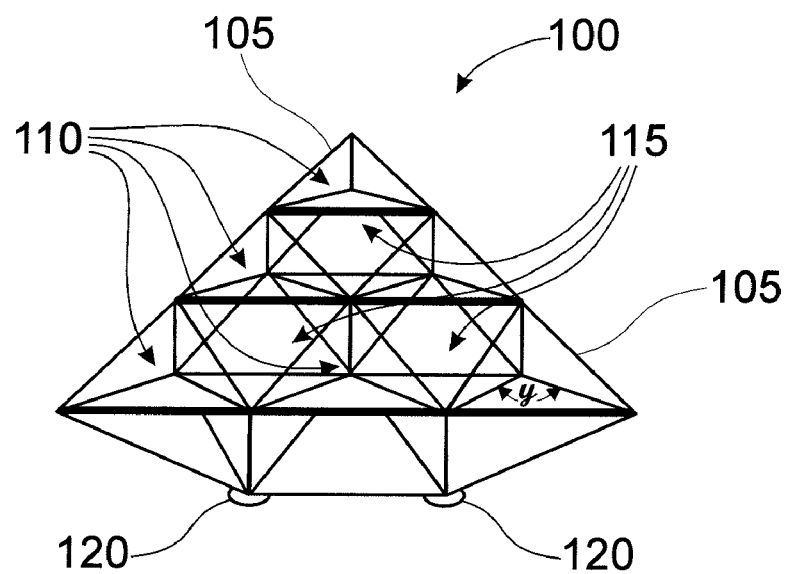
FIG. 1 is a diagram illustrating a front perspective view of an inhabitable space frame, according to some embodiments of the present invention.

The present invention relates to inhabitable space frames. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

FIGS. 1-6 illustrate a basic geometry of a square pyramid inhabitable space frame 100 in the form of four sides supporting each other, each a three-module long space frame side, or "segment", sloping at 45° to the horizontal, according to some embodiments of the present invention.

Referring to FIG. 1, a diagram illustrates a front perspective view of the inhabitable space frame 100. The space frame 100 comprises a vector matrix of strut members 105 that defines a plurality of interconnected basic tetrahedral modules 110. The vector matrix of strut members 105 also defines a plurality of prime octahedral modules 115. Each prime octahedral module 115 is adjacent to at least two of the basic tetrahedral modules 110.

The basic tetrahedral modules 110 and the prime octahedral modules 115 thus define inhabitable living space around the perimeter of the space frame 100. Depending on scale, such inhabitable living space can be subdivided into living spaces such as apartments, atriums, and other conventional hexahedral spaces. The entire space frame 100 is then supported with seismic isolators on footings 120.

Figure 2:
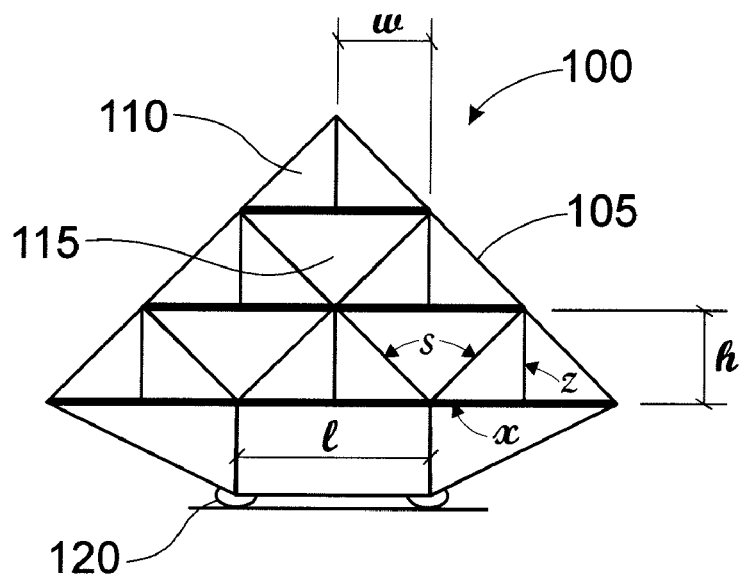
FIG. 2 is a diagram illustrating a front elevation view of the inhabitable space frame shown in FIG. 1.

Referring to FIG. 2, a diagram illustrates a front elevation view of the inhabitable space frame 100. Preferably, each of the strut members 105 is of one of only four discrete lengths or "dimensions", labeled s, x, y and z (where the strut members 105 having a length y are shown in the horizontal plane of FIG. 1). Thus the entire space frame 100 can be constructed from strut members 105 that are prefabricated at only four discrete lengths s, x, y and z. The technology of the present invention thus can be used to fabricate large buildings having inhabitable "four-dimensional space", which can add quality, excitement and profitability to modern architecture.

For example, the space frame 100 may define an apartment complex having inhabitable modules of a length l=100 feet, a width w=50 feet, and a height h=50 feet. Such a space frame 100 can be constructed from a plurality of strut members 105 that have only four discrete lengths, defined as: s=86.6 feet, x=100 feet, y=70.7 feet, and z=50 feet, approximately, measured between node centers at specified temperatures to allow for thermal expansion and contraction. After the foundations and seismic isolators have been constructed and approved on-site, and the crew, equipment, and modular strut members and nodes have arrived, optimally it is erected and performs as programmed. Inhabitable space (real estate) is thus created with a pre-agreed, programmable, predictable process. The above dimensions are provided as examples for ease of calculating possible spans with known technologies, volumes, areas and costs; differing dimensions resulting in at least one right triangular face or plane of repeating tetrahedrons in the matrix may be used for specific applications depending on local conditions, value engineering and cost/benefit analyses.

The sides, or "segments", of the space frame 100 are sloping at 45° so that interior diagonals, defined by the x, y, and z dimensions, are aligned with the conventional hexahedral 90° geometry of inhabitable space.

Figure 3:
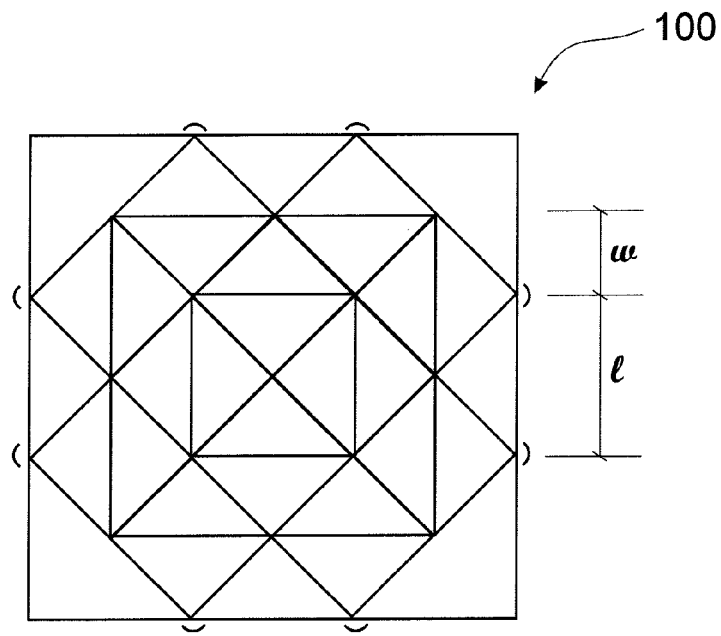
FIG. 3 is a diagram illustrating a plan view of the inhabitable space frame shown in FIG. 1.

Referring to FIG. 3, a diagram illustrates a plan view of the inhabitable space frame 100.

Figure 4:
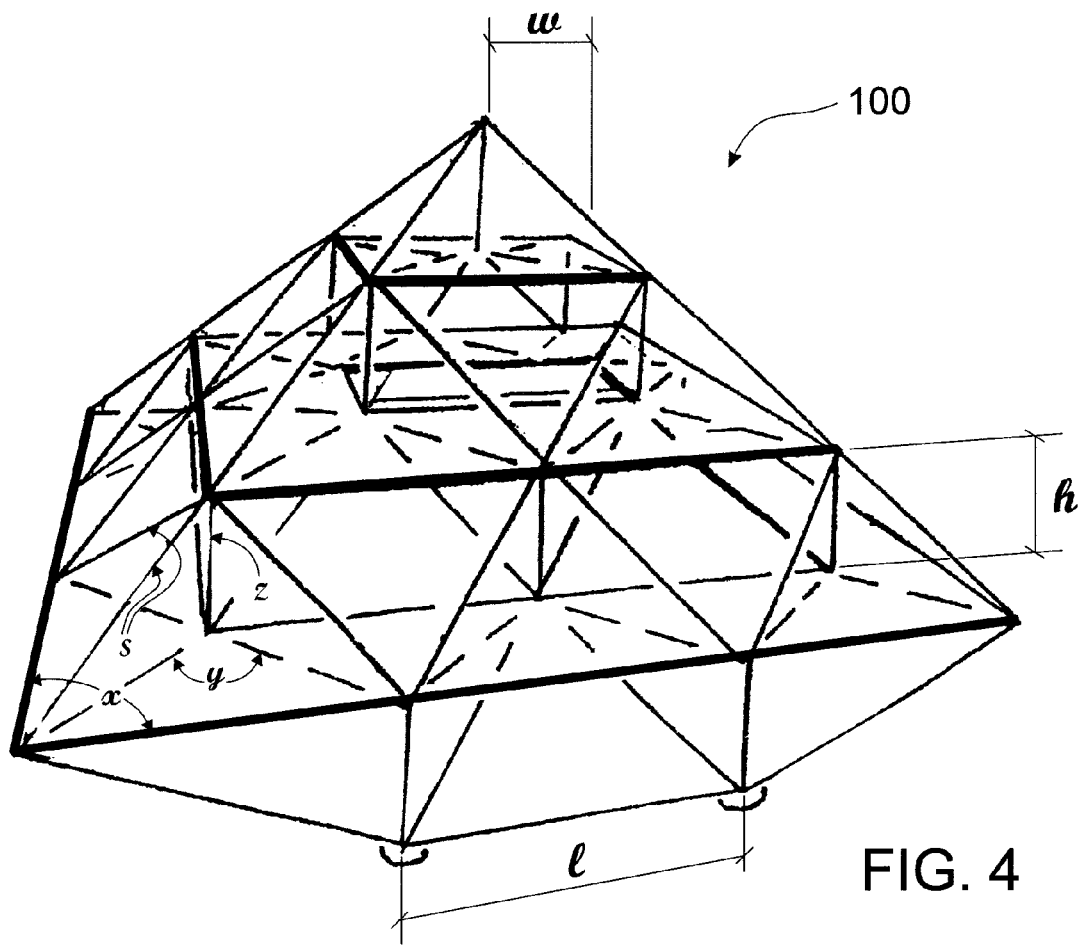
FIG. 4 is a diagram illustrating an aerial perspective view of the inhabitable space frame shown in FIG. 1.

Referring to FIG. 4, a diagram illustrates an aerial perspective view of the inhabitable space frame 100. This view illustrates all four of the strut member dimensions s, x, y and z, and the l, w and h dimensions. As illustrated in the drawings, the basic tetrahedral modules of the present invention are inherently stable and need no added bracing, additional supports or resistance to bending moments, cantilevered foundations, or ductile frame engineering associated with the primary structure. Secondary floors and other structures are then supported with much less construction material due to the inherently stable space provided by the primary structure. The basic tetrahedral modules are then adjacent to prime octahedral modules, which derive their stability from within the continuous isotropic vector matrix of tetrahedrons. According to some embodiments of the present invention, the basic tetrahedral modules always have at least one right triangular face, or plane, with a vertical edge, from which horizontal floors project at right angles thereto. Although only one is required, this embodiment of the invention has three right triangles within each of its basic tetrahedral modules. The slope angle of this space frame can be 45° if the "z" dimension is vertical, and 60° if a "y" dimension is vertical. However, in this example any angle is possible by varying the lengths and right triangles.

The strut members 105 can be interconnected using "pin" joints, as are well known to those having ordinary skill in the art. For example, such joints can be comprised of spherical nodes engineered to securely hold ends of two or more strut members 105 in tension and compression only, but without resisting bending moments. Because moment-resisting, stiff joints are not required, the joints and the strut members 105 can be made lighter and more economically. That enables a substantial savings in materials (such as steel, carbon fiber or other appropriate materials), weight, time and labor, which can substantially reduce the total "carbon footprint" of a structure and associated costs.

Further, the "pin" joints (nodes), transport/erection equipment, and strut members 105 can be shipped (such as by sea, rail, or truck, or possibly by air or space vehicle) in high density with minimal wasted space. The space frame 100 then can be assembled on-site, with custom equipment and specifically trained and experienced crews. Secondary work within the erected primary modules then can be completed as other basic and prime modules are being erected.

As will be understood by those having ordinary skill in the art, floors, decks, roofs, projections, built-in equipment, ceilings and walls can be supported within or above, or suspended from the strut members 105 using conventional and advanced technological construction techniques. Thus, once a skeletal matrix of strut members 105 of the inhabitable space frame 100 is erected, conventional building and architectural techniques can be used to finish rooms, offices, other living areas, solar, wind and convective energy-producing and water feature surfaces and devices, and open spaces according to various architectural, engineering and esthetic demands and prioritized factors. This allows for ease of change for future space demands. Additionally, some techniques may become uniquely adapted for uses within and associated with these space frames, such as prefabricated, modular, plug-in and or deployable systems developed specifically for such use.

Figure 5:
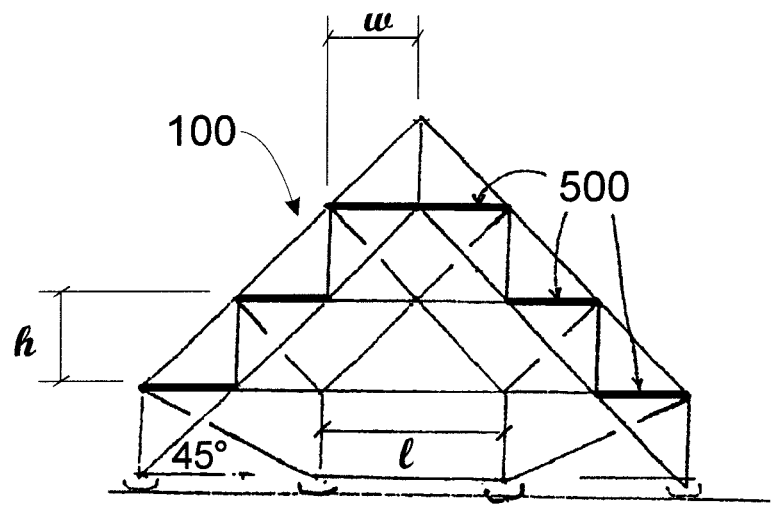
FIG. 5 is a diagram illustrating a sectional view of the inhabitable space frame shown in FIG. 1.

Referring to FIG. 5, a diagram illustrates a sectional view of the inhabitable space frame 100. This view illustrates module floor areas 500, located on three different vertical levels of the space frame 100. Thus the plurality of basic tetrahedral modules 110 and the plurality of prime octahedral modules 115 define the plurality of floor areas 500, each at a different vertical level, around a perimeter of the space frame 100. These modules would support additional floors.

Figure 6:
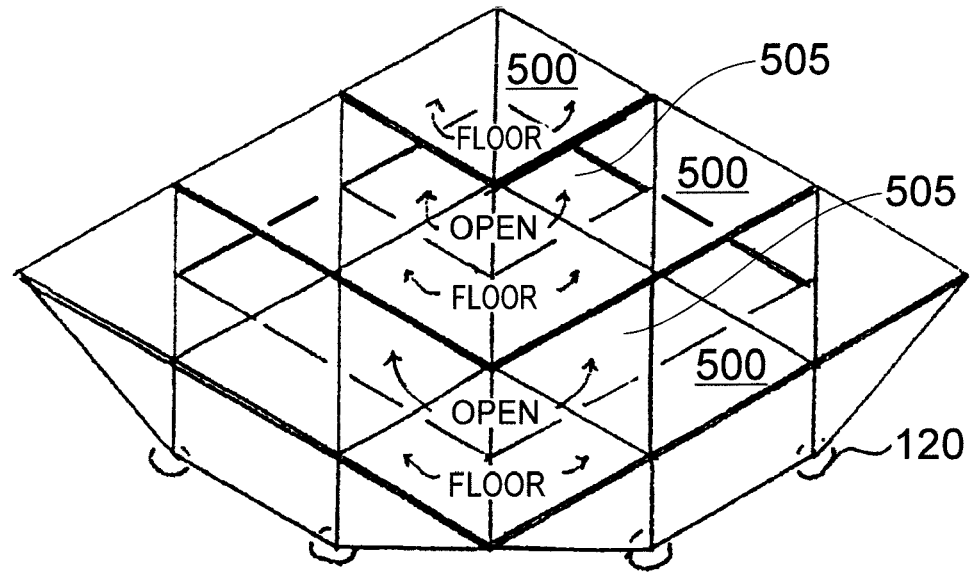
FIG. 6 is a diagram illustrating an isometric view of the inhabitable space frame shown in FIG. 1.

Referring to FIG. 6, a diagram illustrates an isometric view of the inhabitable space frame 100. This view illustrates the floor areas 500 and also open areas 505, which can be designed to remain open for interior light and air circulation, located in the interior of the space frame 100.

The footings 120 include seismic isolators that reduce seismic shock before it enters the primary structure of the space frame 100. Further, the footings 120 reduce the size of a foundational "footprint", so that the space frame 100 is more independent of terrestrial ground movement when compared with conventional ductile frame steel, concrete or wood structures. Also, bigger and fewer seismic isolators are more predictable, cost-efficient and attractive.

FIGS. 7-10 illustrate a basic geometry of an oblique quadrilateral pyramid inhabitable space frame 700 in the form of four sides, or "segments", supporting each other, each a three 86.6 foot module long space frame sloping at 60° to the horizontal, according to some embodiments of the present invention. Compared to the embodiment illustrated in FIGS. 1-6, the space frame 700 illustrates a 45° configuration rotated to another right triangle within the basic modules. Any slope angle is possible by varying the lengths in this example, or changing the number of right triangles in the basic modules to no less than one.

Figure 7:
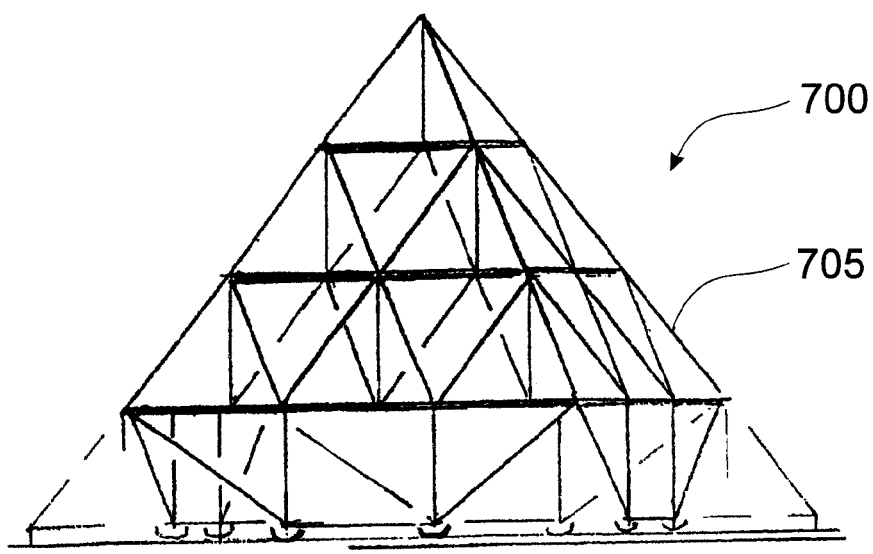
FIG. 7 is a diagram illustrating a side elevation view of an inhabitable space frame, according to other embodiments of the present invention.

Referring to FIG. 7, a diagram illustrates a side elevation view of the inhabitable space frame 700. For example, the space frame 700 may define an apartment complex having inhabitable modules of a length of 86.6 feet, a width of 42 feet, and a height of 70.7 feet. Such a space frame 700 can be constructed from a plurality of strut members 705 having the following four discrete lengths: s=86.6 feet, x=100 feet, y=70.7 feet, and z=50 feet, approximately, measured between node centers at specified temperatures to allow for thermal expansion and contraction, as previously described.

Although l, w and h are changed, because the dimensions of s, x, y and z are the same in both the embodiment shown in FIGS. 1-6, and the embodiment shown in FIGS. 7-10, it is clear that very different space frame structures can be built simply by manipulating the s, x, y and z geometries to adjust a sloping angle. Thus, according to the teachings of the present invention, significant economic savings can be realized through the use of interchangeable strut members mass produced and inventoried for ready use, and or re-use, in large quantities.

Figure 8:
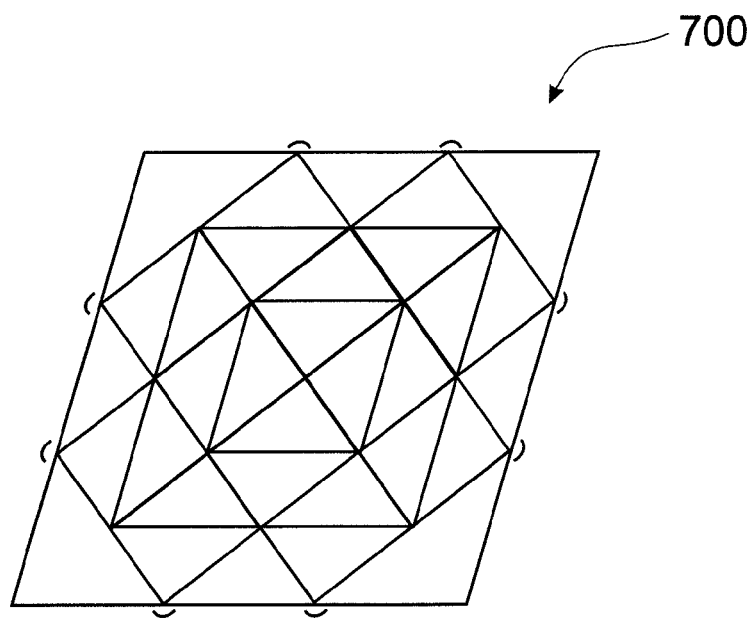
FIG. 8 is a diagram illustrating a plan view of the inhabitable space frame shown in FIG. 7.

Referring to FIG. 8, a diagram illustrates a plan view of the inhabitable space frame 700.

Figure 9:
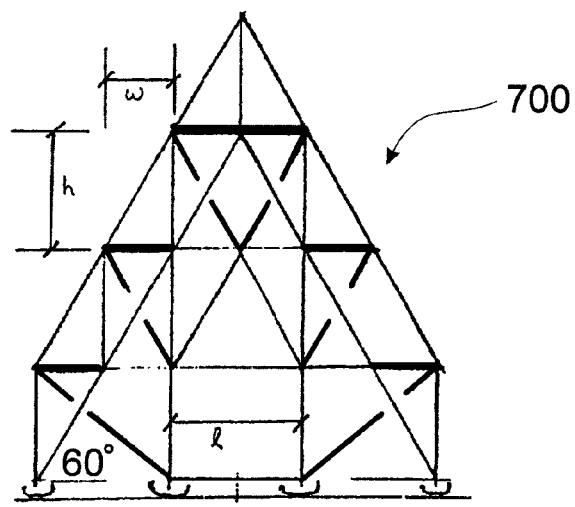
FIG. 9 is a diagram illustrating a section view of the inhabitable space frame shown in FIG. 7.

Referring to FIG. 9, a diagram illustrates a section view of the inhabitable space frame 700. The dimensions of a width "w" and a height "h" of one of the inhabitable modules are also illustrated. For example, as described above, according to one embodiment of the present invention such a length "l" could be 86.6 feet, such a width "w" could be 42 feet and such a height "h" could be 70.7 feet.

Figure 10:
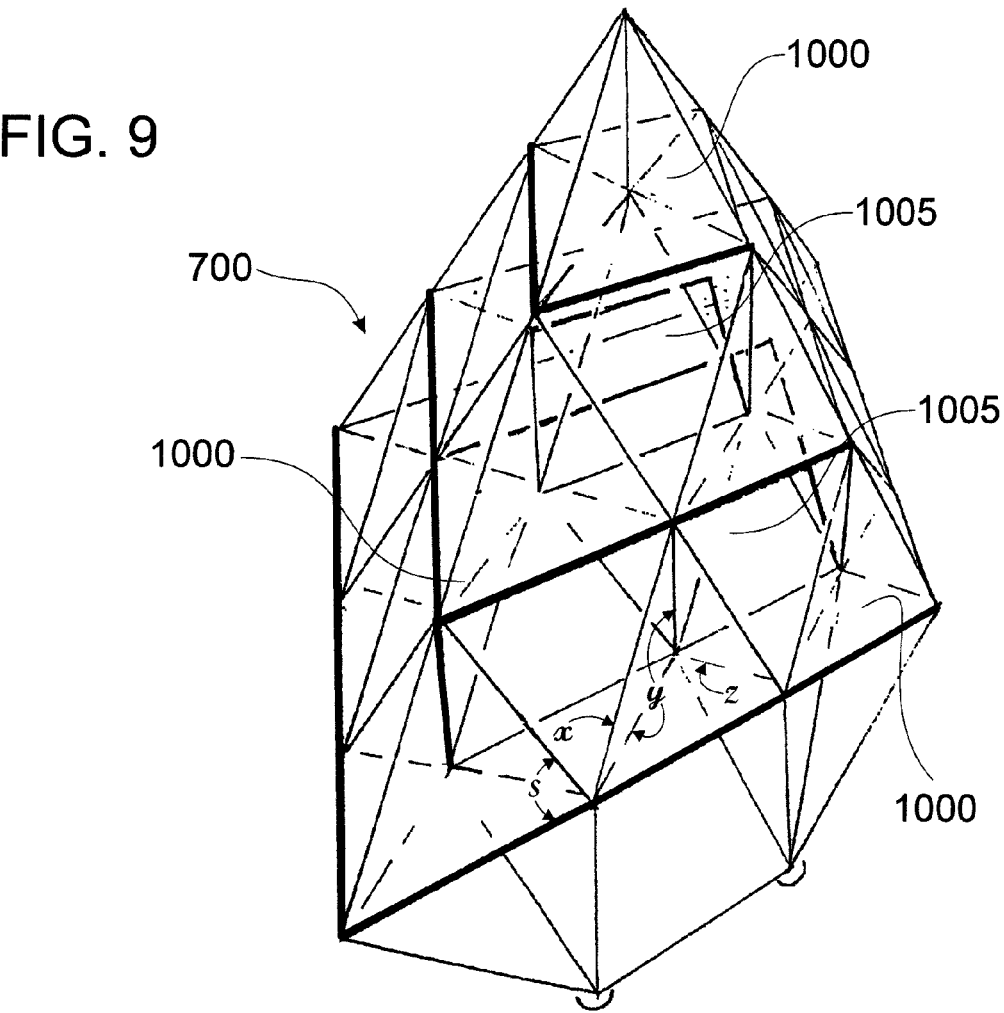
FIG. 10 is a diagram illustrating a perspective view of the inhabitable space frame shown in FIG. 7.

Referring to FIG. 10, a diagram illustrates a perspective view of the inhabitable space frame 700. This view also illustrates module floor areas 1000, located on three different vertical levels around a perimeter of the space frame 700. Further, this view illustrates open areas 1005 located in the interior of the space frame 700. Finally, this view also illustrates all four of the strut member dimensions "s", "x", "y" and "z", and the "l", "w" and "h" dimensions.

Figure 11:
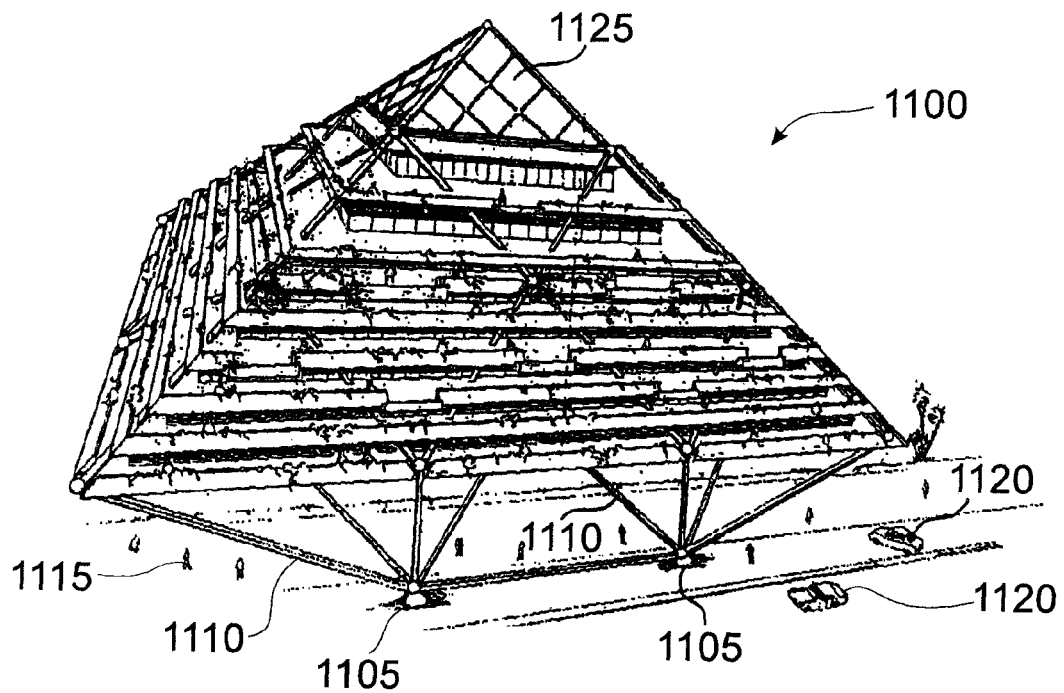
FIG. 11 is a diagram illustrating an aerial perspective view of a completed inhabitable space frame, in the form of an apartment complex or office building, according to still other embodiments of the present invention.

Referring to FIG. 11, a diagram illustrates an aerial perspective view of a completed inhabitable space frame 1100, in the form of an apartment complex or office building, according to some embodiments of the present invention. The inhabitable space frame 1100 is in the form of a 45° square quadrilateral pyramid having a base 300 feet long. Although a quadrilateral pyramid is actually a pentahedron, with four sides plus a base face that is unstable with undulating ground movement, the four sides or "segments" of four-dimensional tetrahedronal space frames support each other somewhat as a cross-barrel arch, or a huddle of football players.

Footings with seismic isolators 1105 and strut members 1110, 1111 support the space frame 1100 above the ground. That enables people 1115 and vehicles 1120 to move freely in an atrium area beneath the structure. A glass enclosed "greenhouse" 1125 at the top enables light to flow down to the atrium, to the ground beneath the structure, and to the interior and under-sides of the inhabitable modules of the space frame 1100.

Figure 12:
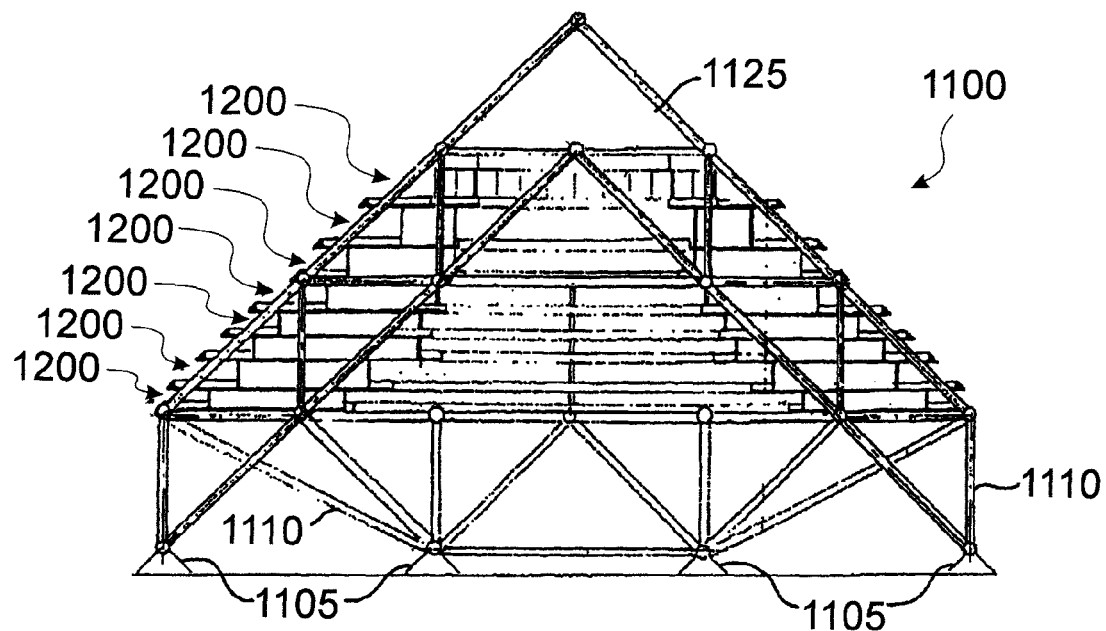
FIG. 12 is a diagram illustrating a section view of the completed inhabitable space frame shown in FIG. 11.

Referring to FIG. 12, a diagram illustrates a section view of the completed inhabitable space frame 1100. This view clearly illustrates eight inhabitable floors each a different height above the ground, within two rows of 50 foot high modules 1200. The top module is open with smaller floors around an open atrium sky light.

Figure 13:
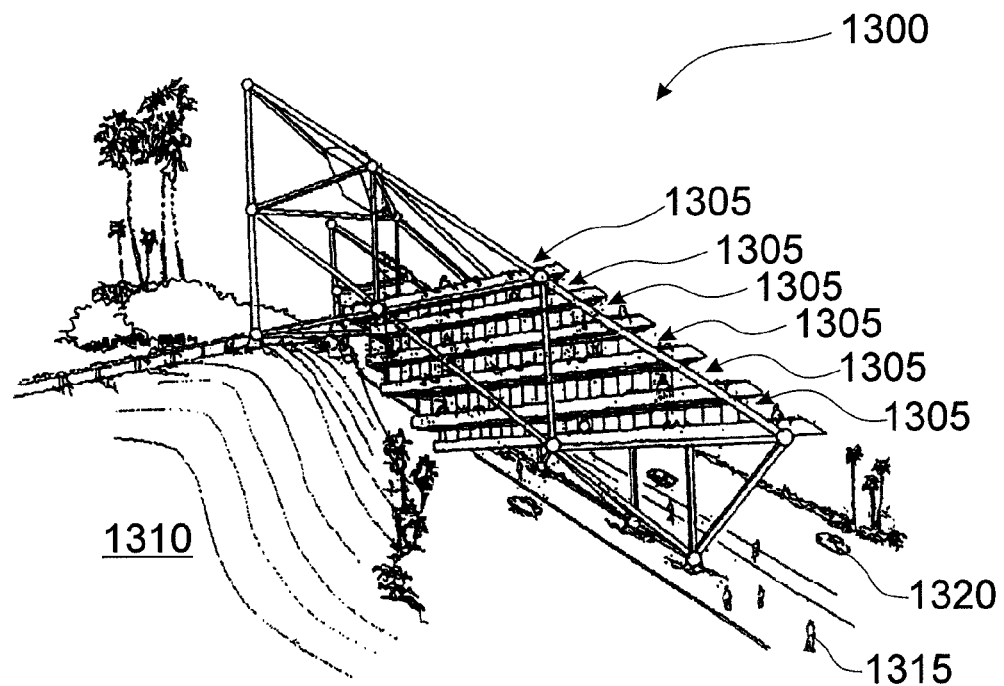
FIG. 13 is a diagram illustrating a side perspective view of a completed inhabitable space frame, in the form of an apartment complex or office building, according to other embodiments of the present invention.

Referring to FIG. 13, a diagram illustrates a side perspective view of two completed triangular inhabitable space frames 1300, in the form of an apartment complex or office building, according to some embodiments of the present invention. These space frames 1300 include six inhabitable floors 1305, each a different height above the ground. This example is 600 feet long and 200 feet high, with completed inhabitable space in a third lower row of 50-foot high modules, which can be later expanded into the open top rows of modules, or more modules can be added or reconfigured. The fourth lower, open modules have longer struts at their ends, which connect directly to the seismic isolators, to close the structure and create the appearance of the entire space frame being suspended above the ground.

In particular, the embodiment of the space frame 1300 illustrates the adaptable and flexible nature of the space frame technology of the present invention. The modules 1305 are shown set at a 45° angle over a stable cliff 1310. People 1315 and vehicles 1320 are then able to move beneath the space frame 1300 at a base of the cliff 1310. Useful and enjoyable living space is thus able to be created in areas, including even extraterrestrial areas, where conventional building techniques might be unusable or prohibitively expensive.

Figure 14:
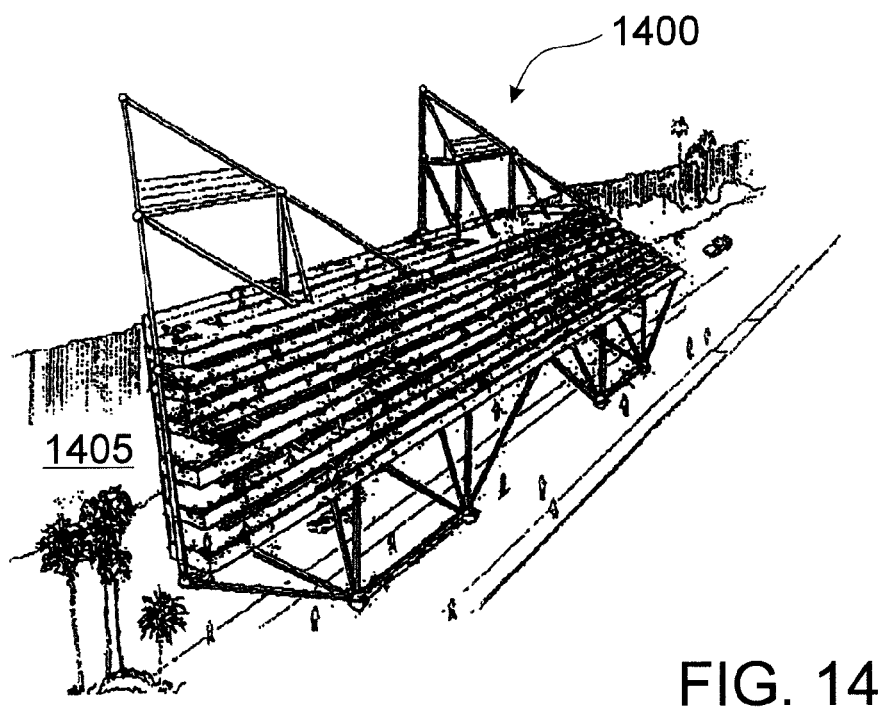
FIG. 14 is a diagram illustrating a front perspective view of a completed inhabitable space frame, in the form of an apartment complex or office building, according to further embodiments of the present invention.

Referring to FIG. 14, a diagram illustrates a front perspective view of a completed inhabitable space frame 1400, in the form of an apartment complex, according to some embodiments of the present invention. Similar to the embodiment shown in FIG. 13, the space frame 1400 is set at a 45° angle over a stable cliff 1405.

Figure 15:
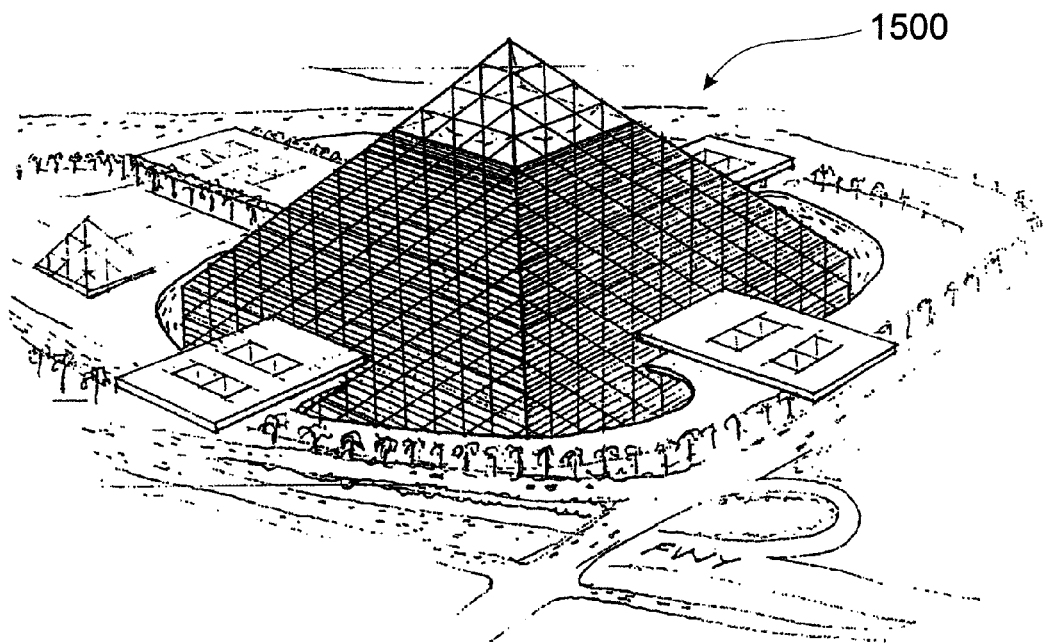
FIG. 15 is a diagram illustrating an aerial perspective view of yet another completed inhabitable space frame, in the form of a large public stadium with its associated uses within one megastructure, according to some embodiments of the present invention.

Referring to FIG. 15, a diagram illustrates an aerial perspective view of yet another completed inhabitable space frame 1500, according to some embodiments of the present invention. The space frame 1500 supports a large, mixed-use public stadium in the form of a 45° quadrilateral pyramid.

The inhabitable space frame 1500 thus illustrates how the teachings of the present invention can be used to build megastructures that can house more than 562 million cubic feet of space, equal to more than 1,200 acres of floor area with 10 feet between floors, within a 1,500 foot square, approximately 50 acre, footprint.

Figure 16:
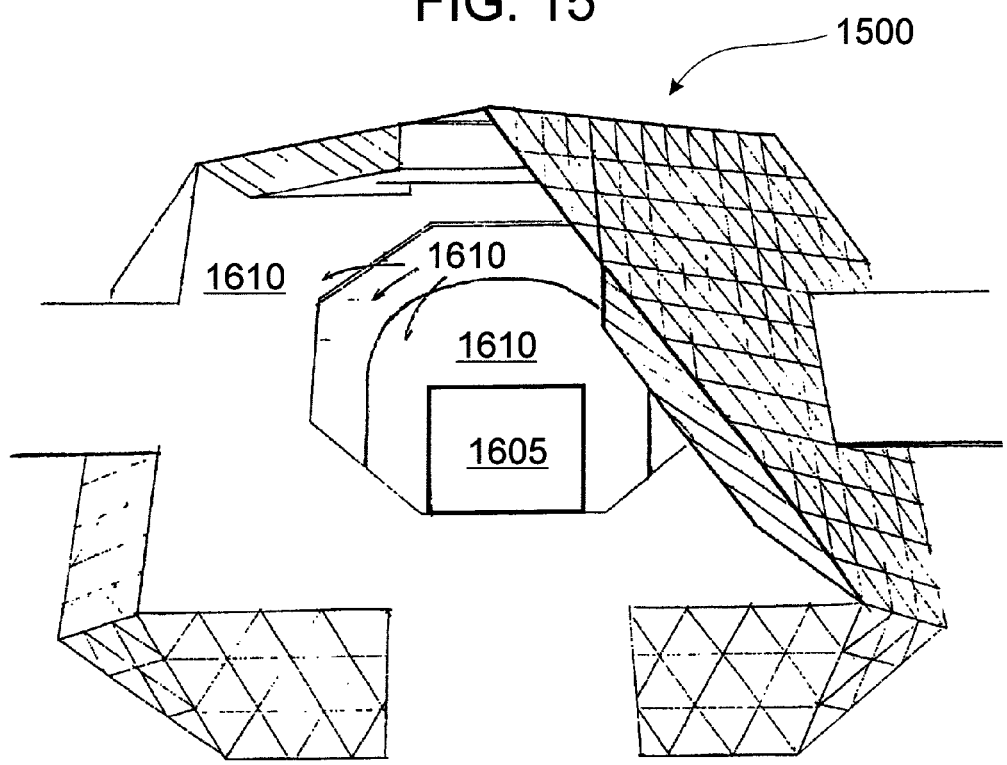
FIG. 16 is a diagram illustrating a cut-away perspective view of the inhabitable space frame shown in FIG. 15.
Figure 17B:
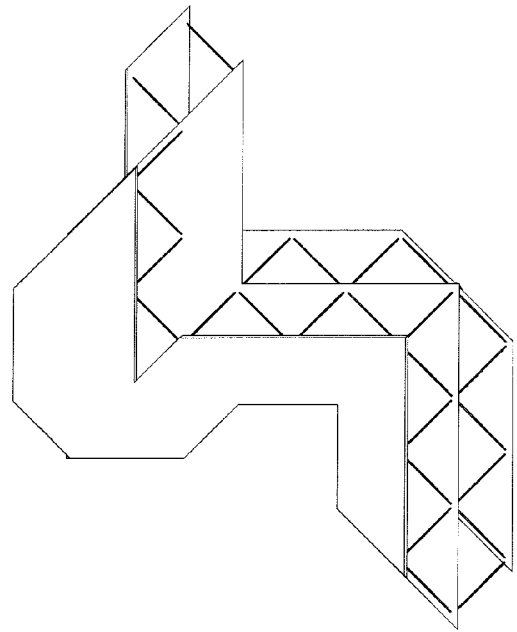
FIG. 17B is another top view of the model of FIG. 17A further illustrating the strut members and one floor per module of the present invention and without showing secondary construction.
Figure 17A:
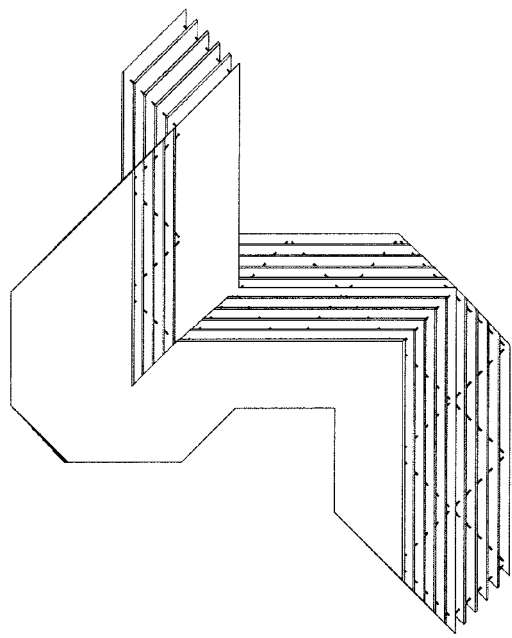
FIG. 17A is a top view of a "cornering" model of a building according to some embodiments of the present invention using only four distinct strut member lengths.
Figure 18B:
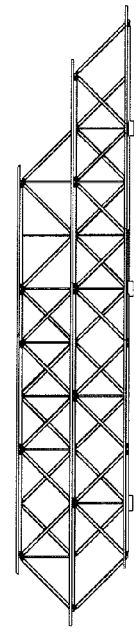
FIG. 18B is another side view of the model of FIG. 17A further illustrating the strut members and one floor per module of the present invention and without showing secondary construction.
Figure 18A:
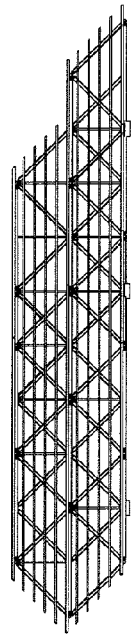
FIG. 18A is a side view of the model of FIG. 17A.

Referring to FIG. 16, a diagram illustrates a cut-away perspective view of the inhabitable space frame 1500. As shown, a playing field 1605 is below grade or at ground level, and seating can be provided at three main levels 1610 around the perimeter of the space frame 1500. Commercial retail office space and/or parking then can be provided in the lower modules of the space frame 1500.

The scale of structures built according to the teachings of the present invention thus can be varied dramatically. For example, the scale can vary from beyond the mega-structure illustrated in FIG. 15 and FIG. 16, and FIG. 1 through FIG. 14, to individual houses, camping kits and to handheld scale model kits, software and video gaming and molecular nano models. Such handheld models, software and molecular models of the present invention can be useful for various purposes such as city planning, architecture and engineering, education, and as therapeutic and recreational toys.

FIG. 17A through FIG. 20A illustrate a "cornering" model with four standard-sized strut members showing how embodiments of the present invention can turn corners inside, outside, over, under and offset in four dimensions in design and construction. To meet specific local conditions, the seismic isolator locations may be reduced due to the 4D nature of the geometry. FIG. 17B through 20B more particularly illustrate features of the invention according to this embodiment with one floor per module, and without any secondary construction such as finishing and exterior surfaces as shown in FIG. 17A through 20A.

Figure 21B:
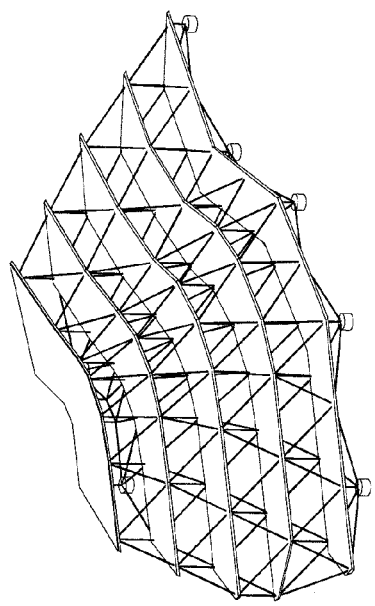
FIG. 21B is another perspective view of the model of FIG. 21A further illustrating the strut members and one floor per module of the present invention and without showing secondary construction.
Figure 22B:
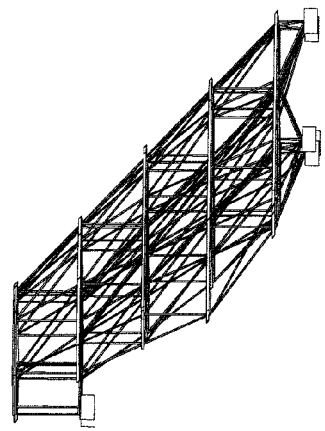
FIG. 22B is another perspective view of the model of FIG. 22A further illustrating the strut members and one floor per module of the present invention and without showing secondary construction.
Figure 21A:
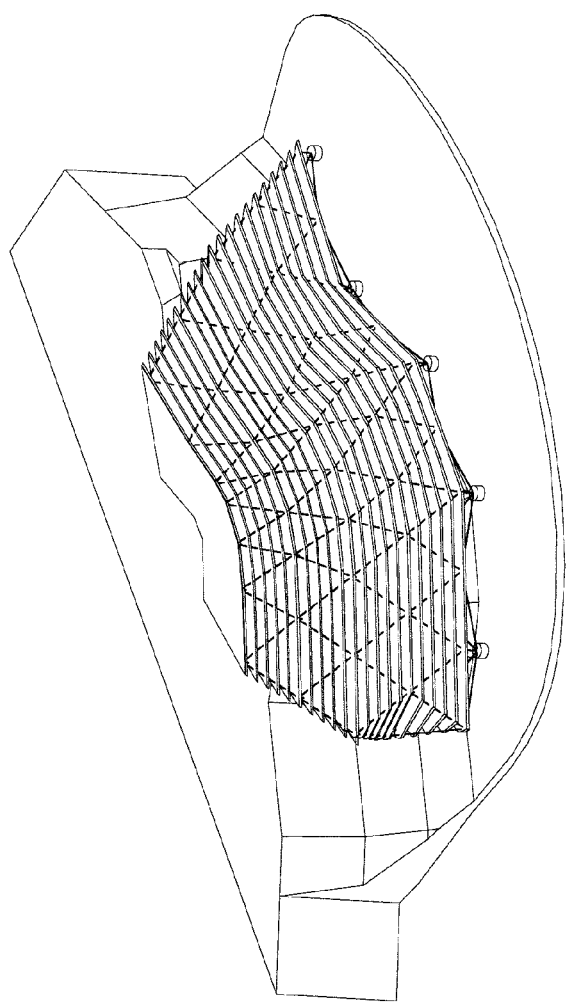
FIG. 21A is a perspective view of a "wave" model of a building according to some embodiments of the present invention using an indefinite number of distinct strut member lengths.
Figure 22A:
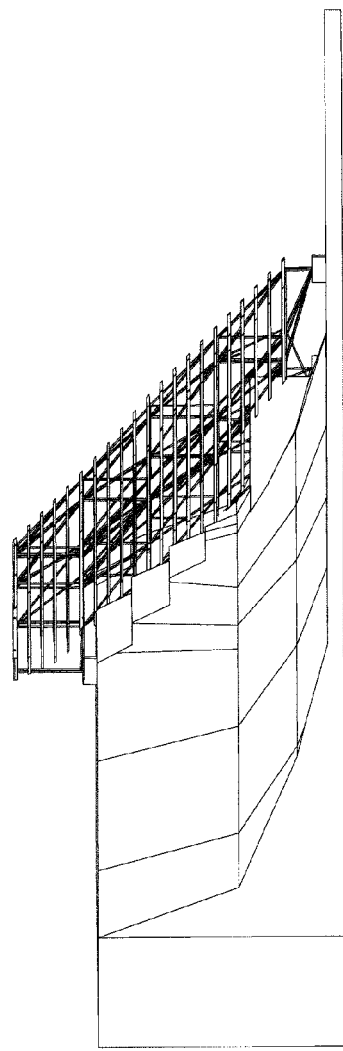
FIG. 22A is a partial cutaway perspective view of the "wave" model of a building according to some embodiments of the present invention using an indefinite number of distinct strut member lengths.
Figure 23B:
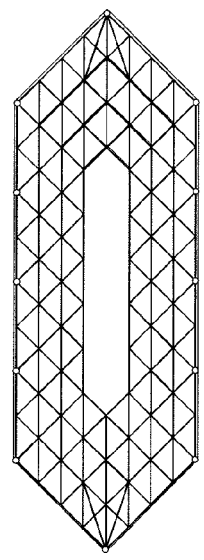
FIG. 23B is another side view of the model of FIG. 23A further illustrating the strut members and one floor per module of the present invention and without showing secondary construction.
Figure 24B:
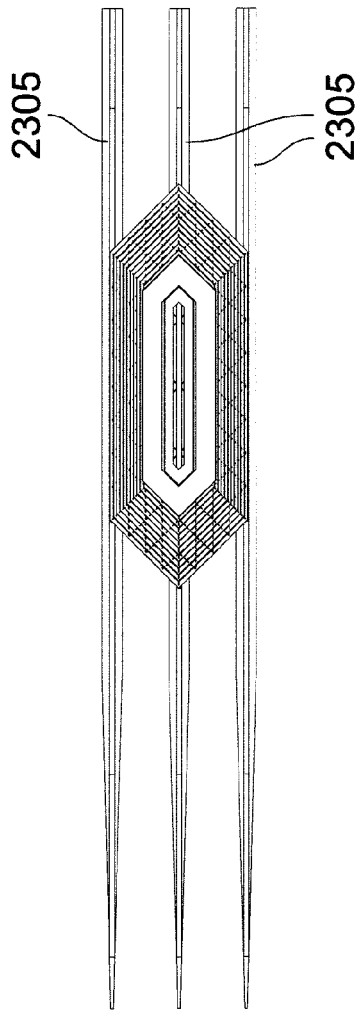
FIG. 24B is another top view of the model of FIG. 23A further illustrating the strut members and one floor per module of the present invention and without showing secondary construction.
Figure 23A:
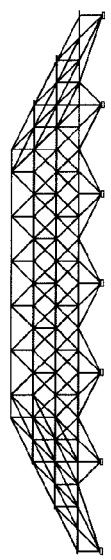
FIG. 23A is a side view of a model of a floating structure according to some embodiments of the present invention.
Figure 24A:
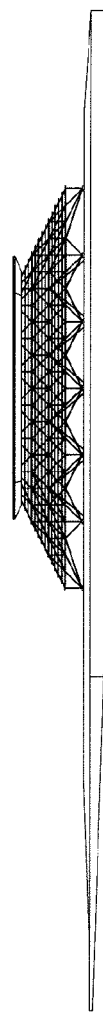
FIG. 24A is a top view of the model of FIG. 23A.
Figure 25B:
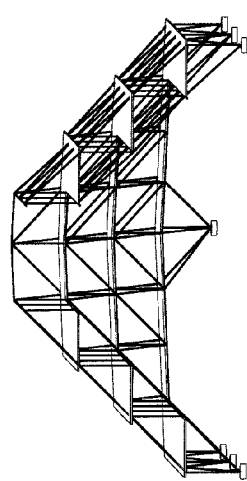
FIG. 25B is a partial cutaway perspective view of the model of FIG. 23A further illustrating the strut members and one floor per module of the present invention and without showing secondary construction.
Figure 26B:
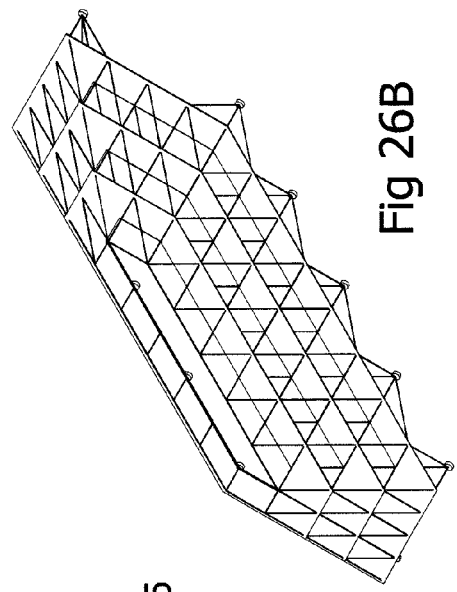
FIG. 26B is top perspective view of the model of FIG. 23A further illustrating the strut members and one floor per module of the present invention and without showing secondary construction.
Figure 25A:
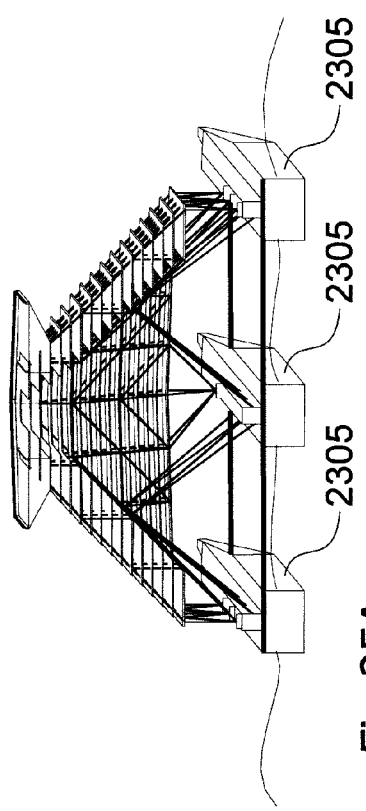
FIG. 25A is a partial cutaway perspective view of the model of FIG. 23A.
Figure 26A:
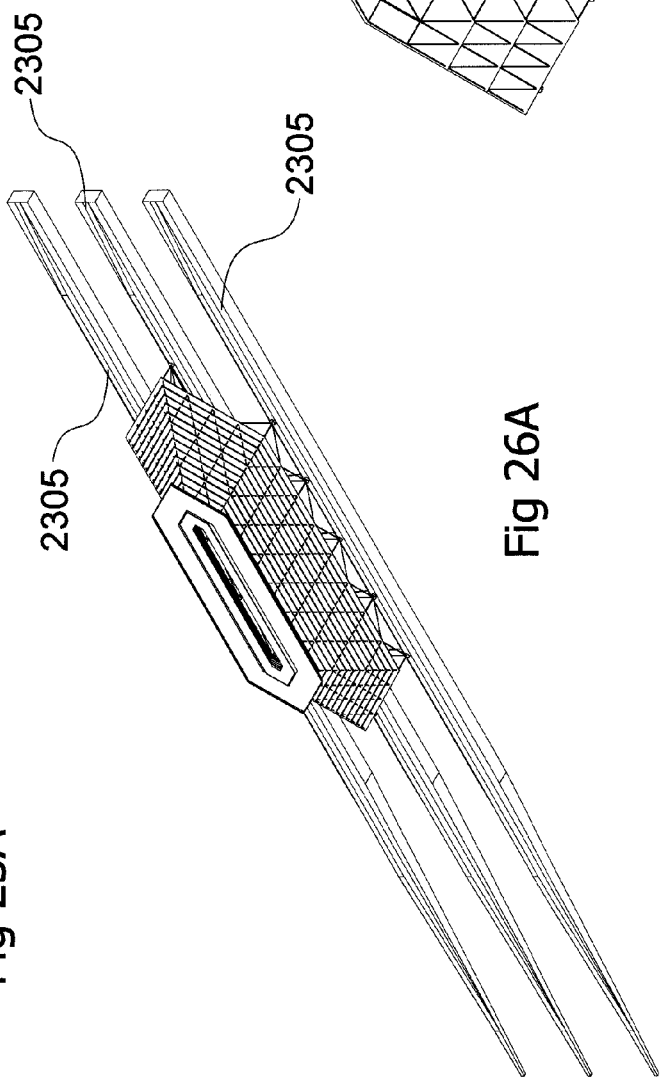
FIG. 26A is a top perspective view of the model of FIG. 23A.

FIG. 21A and FIG. 22A illustrate a "wave" model showing how embodiments of the present invention can be designed and built for inhabitation in virtually any shape, any size, anywhere, and with an indefinite number of strut member lengths. FIG. 21B and FIG. 22B correspond to FIG. 21A and FIG. 22A, respectively, while further illustrating the strut members and one floor per module of the present invention and without showing secondary construction. FIGS. 17A and 17B through FIGS. 22A and 22B illustrate how some embodiments of the present invention can be adaptable to an extremely broad range of existing site conditions, undulating terrain, program demands and preferences.

FIG. 23A through FIG. 26A illustrate an embodiment of the present invention as a truncated hexagonal elongated pyramid constructed with standard-sized strut members, and supported on water with separate ocean hull and ship technology, such as pontoons 2305, that potentially could be used for stable off-shore airports and mixed-use marine communities. FIG. 23B through FIG. 26B correspond to FIG. 23A through FIG. 26A, respectively, while further illustrating the strut members and one floor per module of the present invention and without showing secondary construction.

Figure 27A:
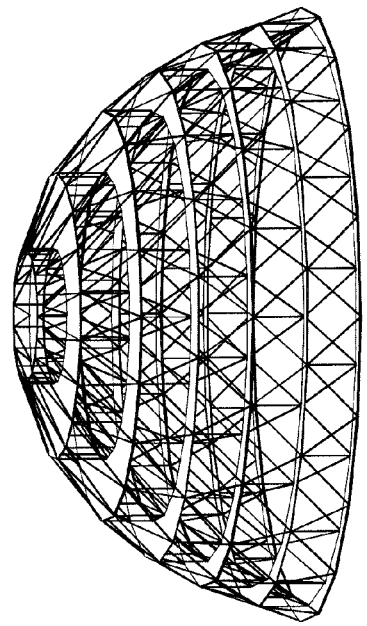
FIG. 27A is a perspective view of a model of a bio-dome according to some embodiments of the present invention.
Figure 27B:
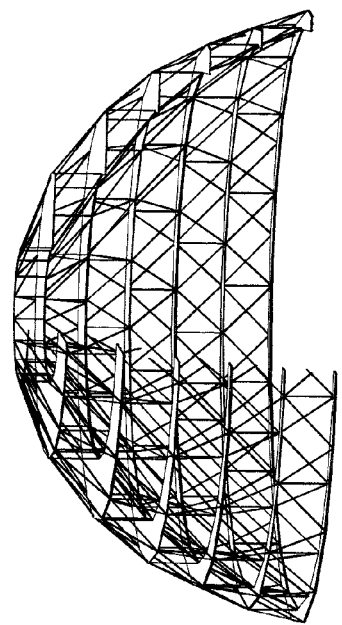
FIG. 27B is another perspective view of the model of FIG. 27A further illustrating the strut members and one floor per module of the present invention and without showing secondary construction.
Figure 28A:
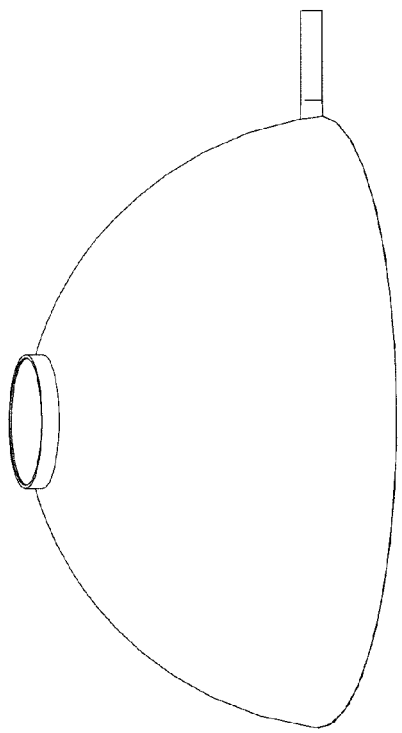
FIG. 28A is a partial cutaway perspective view of the model of FIG. 27A.
Figure 28B:
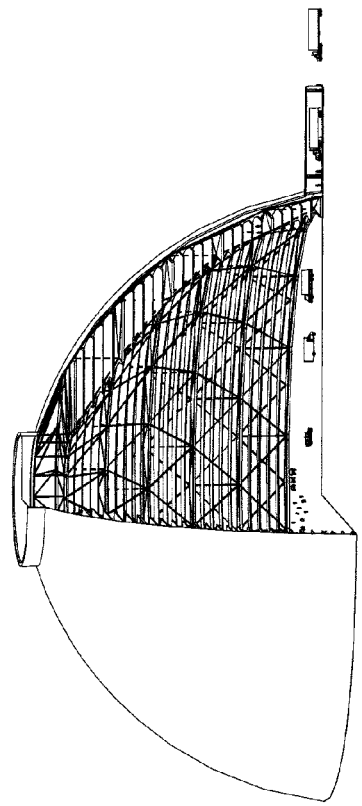
FIG. 28B is another partial cutaway perspective view of the model of FIG. 27A further illustrating the strut members and one floor per module of the present invention and without showing secondary construction.

FIG. 27A and FIG. 28A illustrate a bio-dome constructed of standard-sized strut members, containing its own atmosphere, according to an embodiment of the present invention. The bio-dome can be located in hostile environments or anchored underwater, with its own atmospheric support of inhabitable space, as domes or spheres. Alternatively, the bio-dome can be a cone, sphere, ellipsoid or portions thereof. When 4D geometry of some embodiments of the present invention is curved, the right triangular faces may become distorted into other than right triangles. FIG. 27B and FIG. 28B correspond to FIG. 27A and FIG. 28A, respectively, while further illustrating the strut members and one floor per module of the present invention and without showing secondary construction.

Figure 29A:
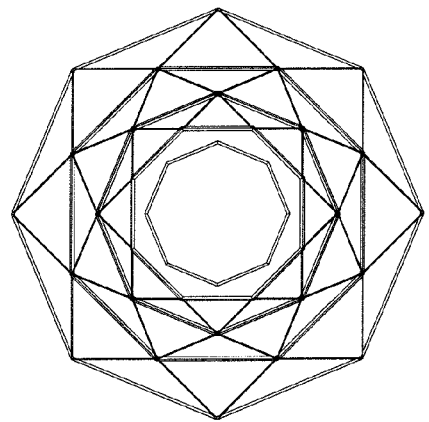
FIG. 29A is a top view of a model of a "PowerTower" according to some embodiments of the present invention.
Figure 29B:
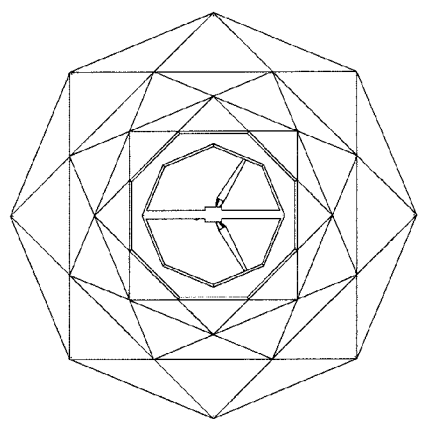
FIG. 29B is another top view of the model of FIG. 29A further illustrating the strut members and one floor per module of the present invention and without showing secondary construction.
Figure 30A:
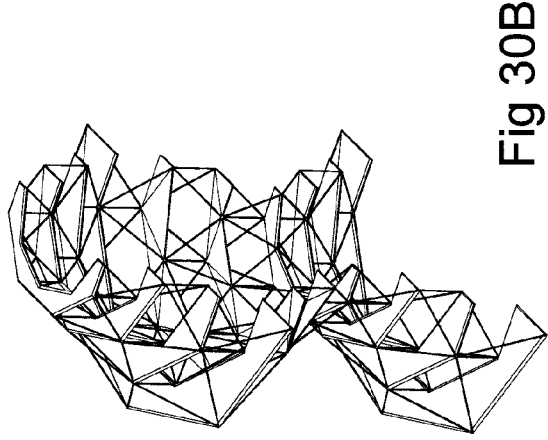
FIG. 30A is a partial cutaway perspective view of the model of FIG. 29A.
Figure 30B:
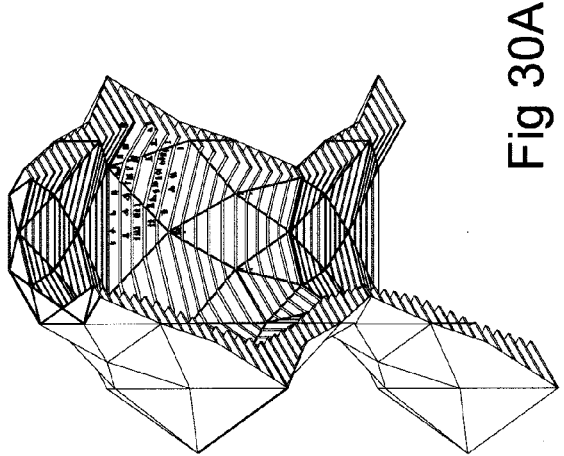
FIG. 30B is another partial cutaway perspective view of the model of FIG. 29A further illustrating the strut members and one floor per module of the present invention and without showing secondary construction.

FIG. 29A and FIG. 30A illustrate how an embodiment of the present invention can be designed and built as an inhabitable "PowerTower" for photovoltaic, wind and convective thermal energy production in conjunction with agricultural production surrounding it. It could be used also as an inhabitable transport vehicle centered around a space elevator. This illustrates how the geometrical structure of embodiments of the present invention can create geo-centered shapes with variable diameters to transfer process energy through their centers, while being inhabited. FIG. 29B and FIG. 30B correspond to FIG. 29A and FIG. 30A, respectively, while further illustrating the strut members and one floor per module of the present invention and without showing secondary construction.

FIG. 31A and FIG. 32A illustrate a 1,000 foot diameter rotating ring-shaped space station according to an embodiment of the present invention. In FIG. 31A a quarter section is removed to show the inside. FIG. 32A is a detail section referenced with a section break line. In this embodiment, the members and nodes of the present invention are tightly packed in inflatable bladders with connectable bulkheads for transport. In place, they are inflated to hold atmosphere, and the members and nodes are then internally assembled into the inhabitable space frames of the present invention. The horizontal floors in this embodiment of the invention are cylindrical, and the vertical walls therein are disc shapes, for inhabitation where the downward pull of "gravity" is replaced with centrifugal force and resisted with the centripetal force of the cylindrical floor rotating around the center at the hub module. As with curving 4D geometry, the right triangular faces in the definition of the present invention may become distorted into other than right triangles. FIG. 31B and FIG. 32B correspond to FIG. 31A and FIG. 32A, respectively, while further illustrating the strut members and section of the cylindrical floor of the present invention and without showing secondary construction.

Membrane bladders, which are easier to ship and deploy than rigid panels, can be used to contain pressure differentials within an embodiment of the present invention without the embodiment being in a balloon shape. Inhabitability would depend on shielding and deflection technologies beyond the scope of this disclosure but within the abilities of those having ordinary skill in the art. If one or more sections, separated with bulkheads, suddenly lost pressure, the bulkheads suddenly close and the inhabitable space frame of the present invention would help to hold the other sections in place to mitigate or prevent catastrophic failure. This configuration includes alternating basic module tetrahedrons with one-half prime modules in circular arcs and linear spokes only one module wide. One-half of a prime octahedral module is a pentahedron with a rectangular face. Because this configuration is only one module wide, an additional diagonal member connects the corners of those rectangular faces, resulting in total basic module tetrahedrons without any prime modules. This illustrates how the regular geometry of basic and prime modules described above regarding FIG. 1 can be further strengthened by using all basic module tetrahedrons when the space frame is only one or two modules wide, and the potential forces extreme.

The geometries of various embodiments of the present invention thus offer a new way to define and use space beyond the limitations of three-dimensional geometry. When space is defined in four dimensions as enabled by the present invention, a corresponding structure can be inherently stable and can be used more efficiently, economically and gracefully in response to energy and environmental concerns, population growth, and for beauty and style.

Comparatively, "three-dimensional space" refers to three static dimensions, each associated with one of three parallel sets of faces or planes of repeating hexahedrons described with "x", "y" and "z" coordinates in a "3D" matrix. "Four-dimensional space" refers to four static dimensions, each associated with one of four non-parallel faces or planes of repeating tetrahedrons described with "s", "x", "y" and "z" coordinates in a "4D" matrix. "Four-dimensional space" as used herein is not to be confused with time, movement or animation, otherwise ascribed as "the fourth dimension." Although 3D coordinates may be used accurately to locate any point in space, those points are not inherently stable when they are physically constructed without buttresses, cross-bracing, shear walls, and or stiff, moment-resisting joints connecting them. Introduction of a fourth dimensional coordinate system, "s", sloping throughout the 3D "x", "y" and "z" coordinates, establishes a 4D digital geometry, a vector matrix, within which the points located at the vector intersections need only axial resistance between them to be stable when physically constructed. Primary structural members in either 3D or 4D require resistance to local loads and bending moments. In 3D, they must successfully resist and transfer those local building loads and building bending moments accumulated throughout the entire structure. In 4D, they only need to resist local loads and bending moments while transferring accumulated building loads and bending moments only axially, so that longer spans and lighter members are possible for inhabitation of the same volumes of space.

After a structure has been designed and constructed in four dimensions, there are far fewer "columns." Prior art shows that space frames do not have "columns," probably because "columns" generally are thought-of as vertical and provide axial and accumulated bending moment transfer in ductile frame buildings. Although only local bending moment resistance is required in the strut members of some embodiments of the present invention, some are vertical. However, there are far fewer vertical members in some embodiments of the present invention due to the scale and inherently stable nature of four-dimensional inhabitable space provided with it.

Although secondary finish improvements for inhabitation may be designed and built in four dimensions, other dimensional systems then can be used to complete the finished inhabitable space with highly advantaged environmental mitigations and economies. This is because the seismic, lateral force and other stability issues would have been resolved with design and construction of the primary structure using the present invention. In other words, after space has been "crystallized" into four dimensions, according to an embodiment of the present invention, it becomes inherently stable, and other dimensional systems then can be used to complete improvements for its inhabitability within and around existing stable space, much like designing and building stage sets within the structural stability and infrastructure of a theatre.

Also, the normal issues of permitting, financing, environmental sustainability, marketing, common interest development infrastructure and other issues would be resolved with the primary structures potentially designed and built according to the scope of the present invention, thus providing a stage for intelligent inhabitation.

Applications of the present invention also can include the creation of entire cities, large mixed-use communities anywhere, land, sea or space. Such communities can have, for example, the following advantages:

a. Increased quality of space: The distances between living areas in an inhabitable space frame according to the present invention can be significantly shorter than distances between those of conventional buildings. Also, although vehicular traffic can circulate through these inhabitable space frames, they can be designed to achieve a balance between car-to-door convenience and overall ambience of a pedestrian environment with appropriate site planning. Additionally, if currently required parking spaces for large vehicles were reduced in the future, that space could be readily converted for other uses due to proportions that may be adopted with specific embodiments of the present invention.

b. Greater flexibility: Large amounts of economically useable space can become available with the inhabitable space frames of the present invention. Development within them can be easier and cleaner than development in the ground because geo-soils, foundation, seismic, environmental, infrastructure, financing, marketing and public approval issues can be solved with the primary structures. Also, there can be greater flexibility in the amounts and placements of useable space because modules can be added to, or removed from, earlier configurations when and if desired. Although the strut members of a pyramid structure may be of equal strength because there are more of them below than above, they can be strengthened to carry increased loads by adding "sister" members and or cables. Thus the inhabitable space frames of the present invention can more easily respond to changing demands or circumstances without changing their physical footprint, more like natural life form morphologies that continually adapt and evolve.

c. Use of otherwise unbuildable sites: Unbuildable sites, such as pits, steep terrain, flood planes, water, satellite orbitals, space elevators, outer space and extraterrestrial environments, can become available for self-sustaining development using the inhabitable space frames of the present invention. Also, the invention can reduce the need to demolish and replace existing neighborhood developments. For example, it is possible to build over existing areas that may be blighted, without expensive preliminary relocation and demolition, so that local inhabitants can move directly into the new inhabitable space frames, bringing historic or practical elements of their old neighborhoods into the architecture of their new city with the present invention. Further, the inhabitable space frames of the present invention can be used to quickly and economically create infrastructures with space frame economies, and can provide superior qualities, sustainability, and life-style options for existing local inhabitants and a geometrically expanding population in a world of diminishing resources, and beyond. Instead of evicting and ejecting local inhabitants, the economies of the present invention allow them to be adequately compensated, in money or life-style improvements, respecting the fact that they are the existing land occupiers where embodiments of the present invention are to be used.

d. Significant cost savings: According to conventional construction techniques, the primary steel frame structure and foundation of a high-rise building generally represents about one-third of the total building costs. The inhabitable space frames of the present invention may require one third to one half less steel or other appropriate material than ductile frame structures, representing potentially more than a ten percent total project cost differential and a significant savings in energy and environmental impact, which can increase net returns and profits.

e. Better options for "green" designs: The inhabitable space frames of the present invention may be architecturally sculpted as highly energy-efficient and energy-producing structures for photovoltaic and thermal systems, wind, passive solar, natural ventilation, comfort and aesthetics, because the four-dimensional matrices of the present invention have greater flexibility and options than are readily apparent, natural or even possible with conventional three-dimensional construction techniques. They include flowing water from rain collection, drainage and recycling for landscaping and gardening, and for environmental, health and aesthetic effects for multi-level real estate that can incorporate gardens or urban farms within them.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

What is claimed is:

1. An inhabitable space frame comprising a vector matrix of strut members that defines a plurality of interconnected basic tetrahedral modules;
wherein the vector matrix of strut members defines a plurality of interconnected basic tetrahedral modules and prime octahedral modules, wherein at least a part of each prime octahedral module in the plurality of prime octahedral modules is adjacent to at least two of the basic tetrahedral modules, and wherein at least some of the basic tetrahedral modules define a right triangular face having as edges a substantially vertical strut member and a substantially horizontal strut member.

2. The space frame of claim 1, wherein the vector matrix of strut members comprises strut members having only four discrete, different lengths.

3. The space frame of claim 1, wherein the vector matrix of strut members comprises strut members having discrete, different lengths.

4. The space frame of claim 1, wherein the plurality of basic tetrahedral modules and a plurality of prime octahedral modules define a plurality of floor areas, each at a different vertical level within, around and projecting from the exterior of a perimeter of the space frame.

5. The space frame of claim 4, wherein the plurality of floor areas is suspended within an interior atrium beneath the space frame.

6. The space frame of claim 1, wherein the inhabitable space frame supports an office or apartment building, a retail/wholesale store, a hotel, an institutional building, an industrial building, an agricultural building or a mega-structure supporting mixed-use projects.

7. The space frame of claim 1, wherein the inhabitable space frame is supported on footings having seismic isolators.

\* \* \* \* \*